Oct. 30, 1928.
W. J. HEMPY
1,689,484
EXPANDING MANDREL
Filed July 6, 1925
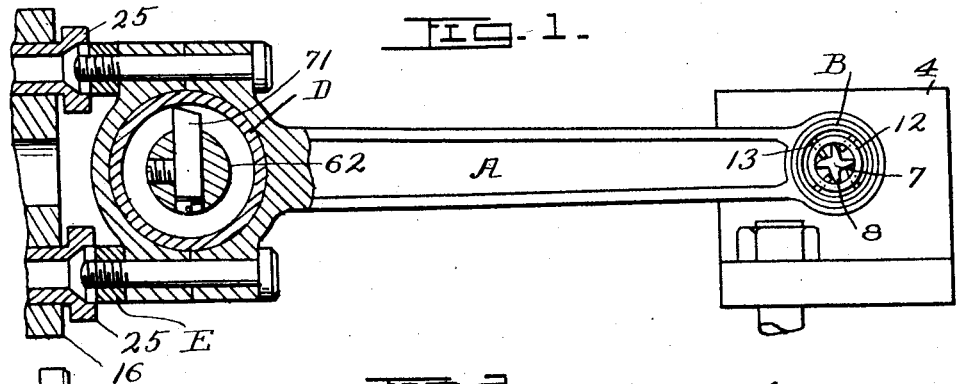
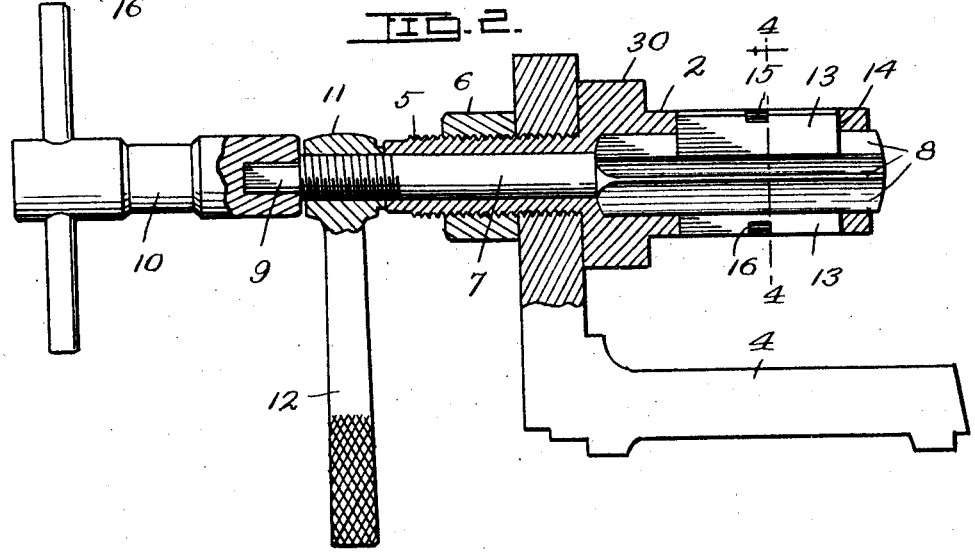
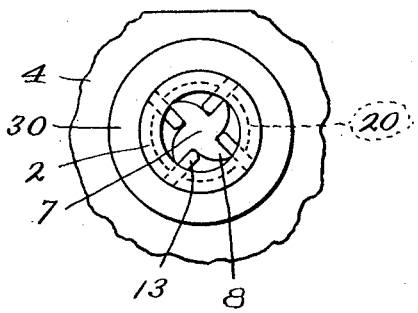
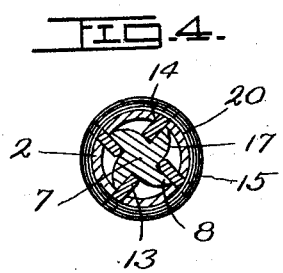
Inventor:
Wilbur J. Hempy,
By F. G. Fischer,
Attorney.
Witness:
Fred C. Fischer.

Patented Oct. 30, 1928.

1,689,484

UNITED STATES PATENT OFFICE.

WILBUR J. HEMPY, OF KANSAS CITY, MISSOURI.

EXPANDING MANDREL.

Application filed July 6, 1925. Serial No. 41,709.

My invention relates to expanding mandrels and while it may be used for holding various articles, in the present instance I have shown it arranged to support one end of a connecting rod while the babbitted bearing at the opposite end of said connecting rod is being bored to fit the crank shaft upon which the connecting rod is to be mounted.

The objects of my invention are to provide a relatively simple and inexpensive device of this character which may be quickly adjusted to fit within different size bearings at the small ends of connecting rods and firmly hold the same while their large bearings are being bored to fit the crank shafts upon which they are to be mounted.

In order that the invention may be fully understood, reference will now be had to the accompanying drawing, in which:

Fig. 1 shows an end elevation of the mandrel holding one end of a connecting rod.

Fig. 2 is an enlarged logitudinal section of the mandrel.

Fig. 3 is an enlarged end view of the mandrel.

Fig. 4 is a cross section on line 4—4 of Fig. 2.

Referring now in detail to the various parts shown by the drawing, A designates a connecting rod such as is employed in internal combustion engines. Said connecting rod A has a small wrist-pin bearing B at one end and a large babbitted bearing D at its opposite end. The babbitted bearing D is shown being bored out to fit the crank shaft upon which it is designed to be mounted, the boring operation being performed by suitable mechanism such as a boring rod 62 equipped with a cutting tool 71. The large end of the connecting rod containing the babbitted bearing D is supported by suitable means such as thimbles 25 carried by a centering chuck 16. The boring mechanism 62—71, the thimbles 25, and the chuck 16 in the present instance are similar to those disclosed by United States Patent for combination boring and facing machines, granted to me October 26, 1926, No. 1,604,940, but any suitable support for the large end of the connecting rod A may be employed.

Referring now more particularly to the expansible mandrel constituting the present invention, 2 designates a tubular member in the form of a stock provided with a peripheral shoulder 30 and a threaded shank 5, which latter is secured in a support 4 with the shoulder 30 abutting one side of said support. The stock 2 is then further secured by a jam nut 6, which is screwed upon the shank 5 until it abuts the opposite side of the support 4 from that engaged by the shoulder 30.

7 designates a rotary member extending axially through the tubular stock 2 and provided with a plurality of peripheral ratchet-like ribs 8 extending longitudinally over a portion of said stock. The rotary member 7 has an angular terminal 9 for the reception of a wrench 10 whereby said member 7 may be rotated. That part of the rotary member 7 adjacent to the angular terminal 9 has a lock nut 11 threaded thereon and adapted to abut the adjacent end of the stock 2 as shown by Fig. 2, to secure said member 7 from turning. For convenience in rotating the lock nut 11, the same is provided with a handle 12.

Elements in the form of blades 13 are associated with the ribs 8 and project into longitudinal guide slots 14 in the stock 2. The blades 13 are normally pressed inwardly by suitable means such as a contractile spiral spring 15 which extends around and is held from lateral movement on the blades 13 by the sides of recesses 16 formed in said blades. The spring 15 is also arranged in a peripheral groove 20 in the tubular member 2, so as not to project out in the way when the small end of the connecting rod A is being placed in position upon said member 2. The support 4 may be slidably mounted upon the bed of the boring machine as in my application above mentioned, or it may be otherwise suitably supported.

In practice the connecting rod A is supported at its large end by the thimbles 25 and at its small end by the mandrel which is expanded against the action of the spring 15 until the blades 13 fit firmly within the bore of said small end as disclosed by Fig. 1. The blades 13 are forced outwardly into engagement with the bored portion of the connecting rod by turning the rotary member 7 clockwise, Fig. 4, with the wrench 10. As the rotary member 7 is turned the curved sides 17 of the ribs 8 force the blades 13 outwardly as described. After the blades 13 have been forced outwardly by the rotary member 7 the latter is locked from backward rotation by the lock nut 11 which is screwed upwardly against the adjacent end of the threaded shank 5. The connecting rod A is now firmly held at both ends so that the babbitted bearing D may be accurately bored with the boring tool 62, a result which cannot always be accomplished when the small bearing B of the connecting rod A is free to move more or less when mounted on a solid pin instead of my expansible mandrel.

After the bearing D has been bored to proper size the connecting rod A can be quickly removed by moving the centering chuck 16 backwardly to clear the thimbles 25 of the nuts E on said connecting rod. The lock nut 11 is then unscrewed out of engagement with the adjacent end of the shank 5, so that the rotary member 7 can be turned backwardly either by the wrench 10 or the spring 15 which forces the blades 13 inwardly.

From the foregoing description, taken in connection with the drawing, it is apparent that I have provided a device embodying the advantages above pointed out, and while I have shown the preferred construction, combination and arrangement of parts, I reserve the right to all such modifications thereof as properly fall within the spirit and scope of the invention as claimed.

Having thus described my invention, what I claim and desire to secure by Letters Patent, is:—

A device of the character described consisting of a tubular member having an axial shank adapted to be threaded in a support and provided with a peripheral shoulder for abutting one side of said support, a jam nut threaded upon said shank and adapted to abut the opposite side of the support and coact with said shoulder in holding the tubular member stationary, a rotary member extending through the axis of the tubular member and projecting from one end of the latter to receive a wrench whereby it can be rotated, peripheral ribs arranged within the tubular member and integral with and extending longitudinally of said rotary member, a longitudinal side of each rib being curved, blades bearing against said curved sides and adapted to be adjusted outwardly through guide slots in the tubular member when the rotary member is rotated in one direction, a handle including a lock nut threaded upon the projecting end of the rotary member and adapted to be adjusted into engagement with the adjacent end of the tubular member and coact with the adjacent ends of the ribs in locking said rotary member, and spring means for yieldably holding the blades in engagement with the ribs.

In testimony whereof I affix my signature.

WILBUR J. HEMPY.